(12) United States Patent
Arnaud et al.

(10) Patent No.: US 8,226,428 B2
(45) Date of Patent: Jul. 24, 2012

(54) ELECTRICAL CONTACT BETWEEN PIECES OF HIGH AND MEDIUM VOLTAGE EQUIPMENT, ADAPTED FOR ACCOMMODATING TILT

(75) Inventors: Alain Arnaud, Aix les Bains (FR); Jean-Pierre Roulet, Le Bourget du Lac (FR); Jean-Michel Berals, Aix Less Bains (FR)

(73) Assignee: Areva T & D SA, Paris la Defense Cedex (FR)

( * ) Notice: Subject to any disclaimer, the term of this patent is extended or adjusted under 35 U.S.C. 154(b) by 0 days.

(21) Appl. No.: 11/989,025

(22) PCT Filed: Jul. 21, 2006

(86) PCT No.: PCT/EP2006/064512
§ 371 (c)(1),
(2), (4) Date: Jan. 18, 2008

(87) PCT Pub. No.: WO2007/010038
PCT Pub. Date: Jan. 25, 2007

(65) Prior Publication Data
US 2009/0130922 A1 May 21, 2009

(30) Foreign Application Priority Data
Jul. 22, 2005 (FR) .................................... 05 52280

(51) Int. Cl.
*H01R 13/64* (2006.01)

(52) U.S. Cl. ....................................... 439/252; 439/251

(58) Field of Classification Search ........... 439/246–252
See application file for complete search history.

(56) References Cited

U.S. PATENT DOCUMENTS

| 3,086,190 A | 4/1963 | Neidecker et al. | |
| 4,111,511 A * | 9/1978 | Bolin | 439/252 |
| 4,662,706 A * | 5/1987 | Foley | 439/851 |
| 4,929,188 A * | 5/1990 | Lionetto et al. | 439/349 |
| 5,176,542 A * | 1/1993 | Grappe | 439/821 |
| 2001/0019923 A1* | 9/2001 | Moll et al. | 439/816 |
| 2001/0055919 A1 | 12/2001 | Keiser et al. | |

FOREIGN PATENT DOCUMENTS

| EP | 1 119 077 | 7/2001 |
| WO | WO 2004/031595 | 4/2004 |

OTHER PUBLICATIONS

French Preliminary Search Report, FA 671402, FR 0552280, dated May 9, 2006.

* cited by examiner

*Primary Examiner* — Ross Gushi
(74) *Attorney, Agent, or Firm* — Nixon Peabody LLP

(57) ABSTRACT

In an electrical connection for high-voltage or medium-voltage switchgear, a bar (2) is inserted in a recess (6) provided with a projection (10). In the invention, the dimensions are established so that the axes (AA, BB) of the bar (2) and of the projection (10) can be inclined relative to each other. Spring-forming conductor elements (12, 14) establish the electrical connection even in the event of tilt. A high-performance electrical contact can thus be obtained compactly, which makes it possible to perform assembly/disassembly operations on electrical equipment without any additional element of the telescopic ferrule or separable bar type.

26 Claims, 3 Drawing Sheets

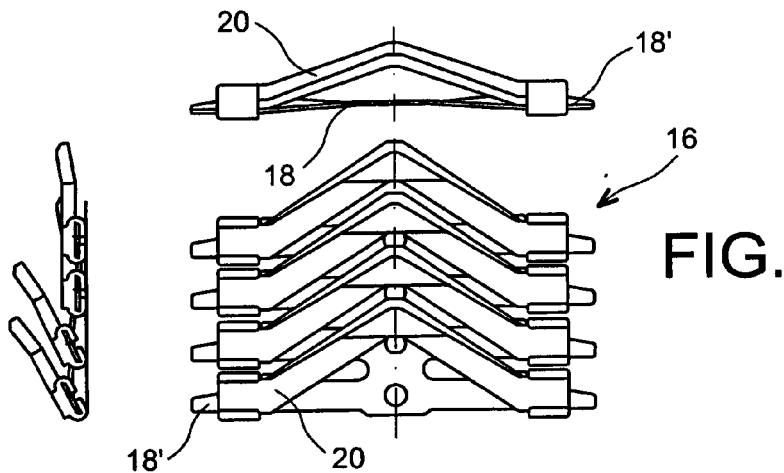
FIG. 2A
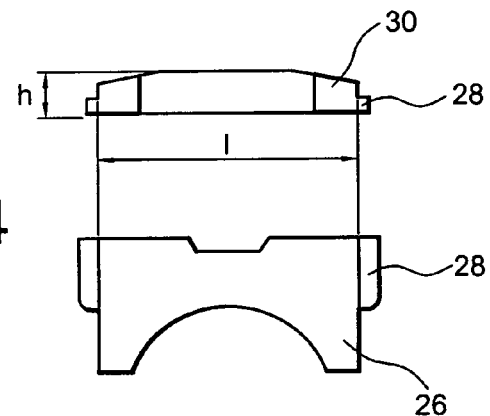
FIG. 4
FIG. 2B
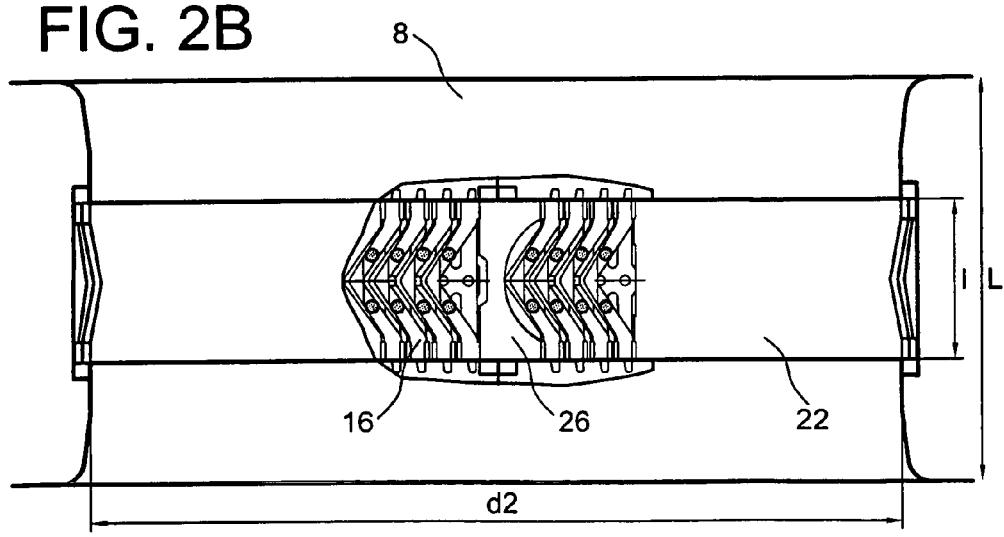

ELECTRICAL CONTACT BETWEEN PIECES OF HIGH AND MEDIUM VOLTAGE EQUIPMENT, ADAPTED FOR ACCOMMODATING TILT

CROSS REFERENCE TO RELATED APPLICATIONS OR PRIORITY CLAIM

This application is a national phase of International Application No. PCT/EP2006/064512 entitled "Electrical Contact Between High Or Medium Voltage Apparatuses That Is Capable Of Swiveling", which was filed on Jul. 21, 2006, which was not published in English, and which claims priority of the French Patent Application No. 05 52280 filed Jul. 22, 2005.

TECHNICAL FIELD

The invention relates to the field of making connections between pieces of electrical equipment. This type of connection between pieces of electrical equipment is such that the electrical contact is permanent with the exception of assembly or maintenance operations, and that the engagement is semi-stationary.

More particularly, the invention relates to the possibility of procuring engagement that guarantees the electrical and mechanical connection functions between two relatively movable portions of a contact block, even though the two portions are intentionally not adjusted to be snug-fitting, so that it is possible to incline them relative to each other.

The invention has a particular application for high-voltage or medium-voltage equipment; it makes it possible to reduce cost during assembly and disassembly operations.

STATE OF THE PRIOR ART

For passing current between pieces of high-voltage or medium-voltage switchgear, a contact block is usually made up of two portions that are mounted to move relative to each other and that are connected to different elements of the switchgear in order to pass electrical current. The movement between the two portions is used only for assembly and disassembly operations.

Conventionally, as illustrated, for example, in Document FR 2 810 463, a first portion, for example a bar provided with an electrical contact at at least one end, is mounted to move in translation so as to be connected to a stationary contact, usually provided with a cylindrical recess into which the bar is inserted so as to be held in position. Engaging the bar in the stationary contact of the contact block thus guarantees electrical connection and mechanical retention. In fact, since the rigid bars can be very heavy, of the order of hundreds of kilograms for example, the mechanical load exerted on the stationary contact is important.

Ideally, the moving and stationary portions are exactly aligned and adjusted to guarantee the best possible electrical contact when the pieces of equipment are assembled together, i.e. when the bar is engaged in the stationary contact. But misalignment is possible between the assembled-together pieces of equipment, and clearance can be recommended between the two portions.

In addition, in order to enable metal-clad high-voltage or medium-voltage substation equipment to be assembled and disassembled, separable couplings can be seen to be necessary between the pieces of equipment. Such couplings are generally constituted by a telescopic ferrule and by a separable bar; separating the telescopic ferrule and its bar generates space between the pieces of equipment, thereby enabling them to be disconnected.

SUMMARY OF THE INVENTION

Among other advantages, the invention proposes to mitigate the above-described drawbacks, and specifically to make it possible for the stationary contact and the moving contact to be inclined relative to other, i.e. for the contact bar and the contact recess to be inclined relative to each other. In the invention, advantage is taken of this allowance for tilting during assembly and disassembly operations, during which it is possible to incline the connection bar relative to the axis of the stationary contact, thereby making it possible to omit telescopic elements and separable bars.

The invention thus makes it possible simultaneously to have high-performance electrical contact compactly, together with allowing for tilting between the current conductor bar and the stationary contact. By means of the invention, "high-performance" electrical contact can be obtained compactly: this type of contact is particularly adapted for a permanent current in the range 2000 amps (A) to 6300 A, in particular greater than at least 4000 A, and for a short-circuit current in the range at least 31.5 kiloamps (kA) to 63 kA for at least three seconds.

More generally, the invention relates to a connection for interconnecting two portions that engage one in the other and that are mounted to move relative to each other, the connection including elements making it possible to compensate for their clearance, and to incline one of the portions relative to the other while also maintaining their functions.

In one of its aspects, the invention thus provides a contact block for pieces of high or medium voltage electrical equipment, comprising two portions mounted to move relative to each other, in particular a rigid tube suitable for insertion into a recess provided with a projection. The dimensions of the two portions are such that the axes of the two portions do not necessarily coincide. Thus the bar can be inclined relative to the second portion at an angle advantageously of the order of 4°, or less than 7°. This inclination, equivalent, de facto, to one extra degree of freedom, makes it possible to facilitate insertion and removal of the moving portion by means of greater flexibility as regards alignment constraints.

Electrically-conductive spring-forming elements are present in the block in order to compensate for each of the clearances between the first and second portions; two spring-forming elements are located in the same radial plane so as to form a pair. The spring-forming elements are advantageously positioned on a single one of the portions of the block, in particular on either side of the bar or facing each other in the recess (on the wall and on the internal projection).

Advantageously, a plurality of spring-forming elements are provided, distributed around the periphery in order to compensate for the clearance uniformly about the axis; preferably, the spring-forming elements are annular. For example, the spring-forming elements can be strips of blades or springs having inclined turns.

The spring-forming elements, which are usually made of metal, can be associated locally with mechanical connection supports, e.g. three parts made of polyamide that make it possible support the bar if necessary, thereby avoiding generation of swarf due to the metal-on-metal friction between the bar and the recess, or between the bar and the central projection.

In another aspect, the invention provides the use of this possibility of accommodating tilt in a high-voltage or medium-voltage device for interconnecting electrical contacts.

The invention also relates to a connection device comprising a bar secured at each end to a piece of electrical equipment in a contact block as defined above.

BRIEF DESCRIPTION OF THE DRAWINGS

The characteristics and advantages of the invention will be better understood on reading the following description with reference to the accompanying drawings, which are given by way of non-limiting illustration, and in which:

FIG. 2A shows an embodiment of the spring-forming element, and FIG. 2B shows how it is integrated into a wall;

FIG. 4 is a face view from above, showing a preferred embodiment of a mechanical support of the invention.

DETAILED DESCRIPTION OF PARTICULAR EMBODIMENTS

Figure 1A:
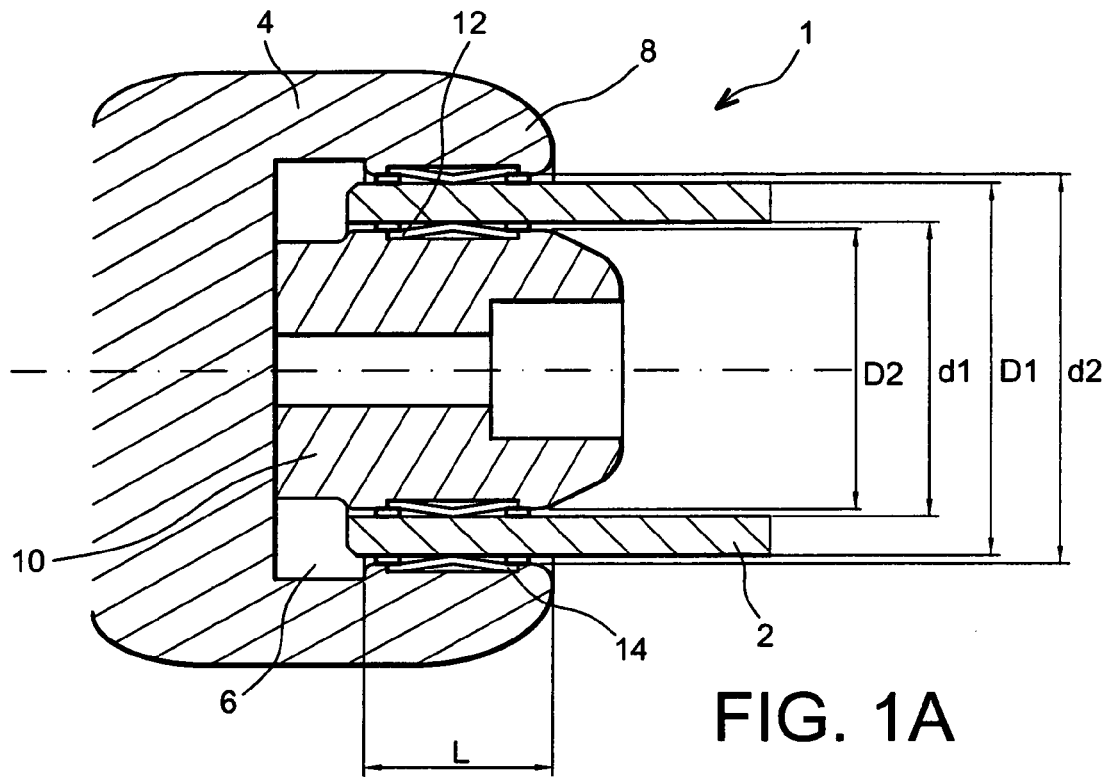
FIGS. 1A and 1B show contact blocks of the invention.

A contact block of the invention can be used mainly for making a connection between two pieces of high or medium voltage equipment, in which case it is localized at the boundary of the pieces of equipment: in fact, a bar joins two pieces of equipment via two connections, one at each of its ends. The connection, which is usually made, can be broken, in particular during maintenance operations: it must therefore be possible to disconnect from one of the pieces of equipment to which it is connected in a contact block of the invention.

As shown in FIG. 1, a electrical connection block 1 of a high-voltage or medium-voltage device is made up of two portions that are mounted to move relative to each other. The first portion 2 or "bar" is usually in the form of a metal cylindrical tube, e.g. made of aluminum or copper. Preferably, the tube 2 is circularly symmetrical about an axis AA and has an outside diameter D1 and an internal diameter d1, defining a substantially constant wall thickness, at least at the end portion that is inserted into the stationary portion of the block 1. For example, for high-voltage electrical switchgear, the bar 2 can be made of aluminum, of thickness in the range 5 millimeters (mm) to 15 mm, and of outside diameter D1 lying in the range 50 mm to 200 mm, these dimensions concerning the ends of the bar 2 which can, for example, also be provided with protuberances over its length; the length of said first portion 2 depends on the use, and it lies in the range about 300 mm to 10 m, or even 12 m; thus, the mass of each bar can be of the order of 200 kg.

When the high-voltage or medium-voltage switchgear is assembled, the first portion 2 is coupled to a "stationary" contact 4 (although shown for one end, the tube 2 in particular can be connected at each of its ends to a "stationary" contact 4, thus forming an assembly in which the first and second contact blocks 1 are such that their first and second portions 2 are interconnected and unitary in a single bar). This second portion of the connection block usually comprises a support secured to an element of the switchgear and provided with a recess 6 into which the bar 2 is inserted. The recess 6 is defined by a wall that is usually circularly cylindrical about its axis BB, a cylindrical ring 8 of the wall extending over a length L and holding the bar 2 mechanically; for the above example, the length L can thus be about 50 mm. The wall is dimensioned so that the bar 2 can slide easily, i.e. the inside diameter d2 of the holding portion 8 of the wall (the narrowest portion) is greater than the outside diameter D1 of the first portion 2.

In addition, a central insert 10 that projects into the recess 6 is, for example, used for the electrical connection per se. The insert is of shape and of size that are adapted so that the first portion 2 fits around it, i.e. so that the insert 10 extends symmetrically about the axis BB of the second portion 4 and so that the outside diameter D2 of the insert 10 is less than the inside diameter d1 of the bar 2.

It should be understood that this embodiment is a preferred embodiment and that the usual alternatives are possible: the electrical connection can be established on the walls of the recess 6, optionally in the absence of the insert 10; the shapes of the various elements 2, 8, 10 are not necessarily cylindrically symmetrical but rather variant shapes are possible.

In the invention, the diameters of the holding wall 8, of the insert 10 and of the bar 2 are chosen intentionally so that clearances are provided between all of the elements, the clearances being identical, namely $d2-D1 = d1-D2 > 0$.

For example, for D1=130 mm, it is possible to have 131 mm $\leq$ d2 $\leq$ 135 mm. Another option is D2=75 mm, d1=77 mm, D1=97 mm, d2=99 mm, and L=45 mm.

In order to maintain the first and second portions 2, 4 in alignment, spring-forming elements, in particular conductive spring-forming elements, are provided. Each spring-forming element is arranged in pairs of elements 12, 14 that face each other on either side of the first portion 2, and in the same radial plane that is radial to the axes AA, BB; a pair of spring-forming elements 12, 14 makes it possible to compensate for the clearance between the first and second portions 2, 4.

Figure 1B:
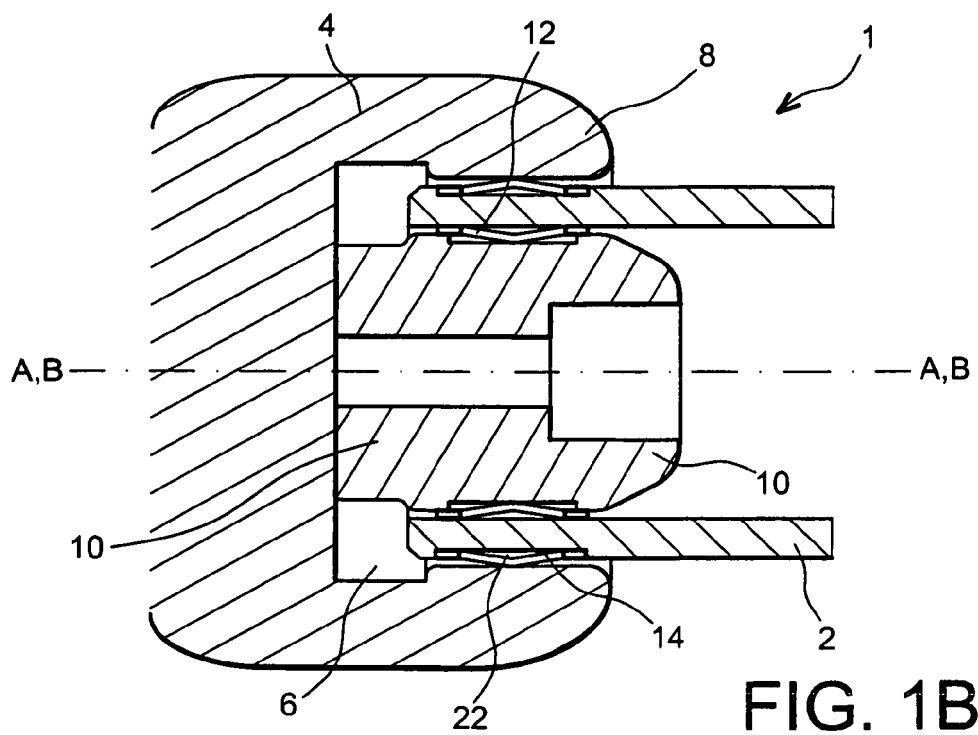

Although the pairs of spring-forming elements 12, 14 can be located on both portions of the block 1, advantageously, in order to simplify the construction and in order to guarantee that the elements of each pair face each other in a common plane, it is preferable for the pairs to be located on the same portion. For example, as shown in FIG. 1A, the first portion 2 is a usual bar, and the pairs of spring-forming elements 12, 14 are positioned so that their respective elements face each other on the cylindrical wall 8 and on the insert 10. It is possible, as shown in FIG. 1B, to position the two spring-forming elements 12, 14 of each pair on the outside face and on the inside face of the tubular wall. of the first portion 2.

The spring-forming elements 12, 14 of each pair can be identical or different. They can extend over a variable arc length. Advantageously, if said arc length is less than 180°, a plurality of pairs of spring-forming elements are disposed on the periphery of the contact block 1 so that the compensation is uniform; e.g. it is possible to have three pairs 120° apart, or four pairs 90° apart, etc.

In a preferred embodiment, at least one of the spring-forming elements 12, 14 is annular, i.e. it covers the entire periphery of the portion in question, and extends over a plane that is radial to the axis thereof. The second element can extend over an arc length only (in which case it is also possible to have a plurality of facing pairs, by subdividing the annular element arbitrarily), or preferably said second element can also be annular.

A preferred embodiment is the use of strips of blades or "lamellae", as described, for example, in Document EP 1 119 077 and shown in FIG. 2A. Such strips of blades 16 comprise a thin metal strip 18 of width of about 26 mm to 30 mm for example; a succession of metal blades 20 are positioned on said strip 18, which blades are triangular in shape, are of thickness less than 5 mm, usually project from the plane of the strip 18 at a maximum angle of less than 90°, and can be lowered towards the strip 18 in the event of pressure. The working height of the blades 20 can thus vary, for example, from 5 mm of maximum height in the active position to 2.5 mm, or less. Such a lamella band 16 is put in place by insertion into a groove 22 that can be straight or preferably T-shaped or dovetail-shaped if the blades 20 leave a portion 18' of the strip free at each end for being held in the groove 22: see FIGS. 1, and 2B. The inclination of the blades 20 thus makes it possible to compensate for clearance that varies, e.g. over 2.5 mm, while maintaining electrical contact.

Advantageously, the strip of blades 16 is placed in a groove 22 located centrally relative to the holding wall 8 of the connection block (see also FIG. 2B). Thus, for example, for a diameter d2=99 mm, the above blades are integrated in a groove 22 extending over a width of 30 mm at its bottom and opening out over a width of 1=26 mm, located 20 mm from either side of the wall 8 which is of length L=70 mm. The depth of the groove 22 is adapted so as to obtain a satisfactory tilt angle, while also remaining in the range of operation of the blades.

In place of the strips of blades 16, the spring-forming element 12, 14 can also, for example be a spring of the "canted coil" type (WO 2004/031595), i.e. an annular spring with inclined turns, which can also be positioned in a groove provided in the corresponding portion; in analogous manner, on being inserted, the turns of the spring are inclined to a greater or lesser extent so as to enable connection to be established.

Regardless of the solution chosen for the spring-forming elements, the contact blocks of the invention thus make it possible to improve machining tolerance, while performing the electrical and mechanical functions inherent to them.

Figure 3A:
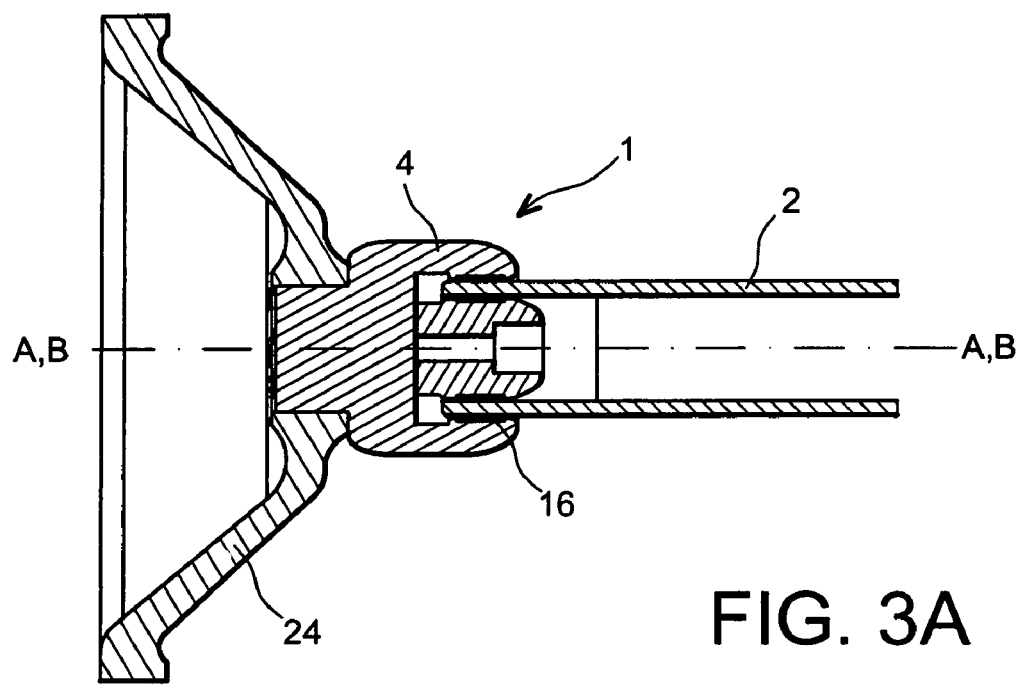
FIGS. 3A and 3B show a preferred embodiment of a contact of the invention, respectively in the aligned position and in a tilt-accommodating position.
Figure 3B:
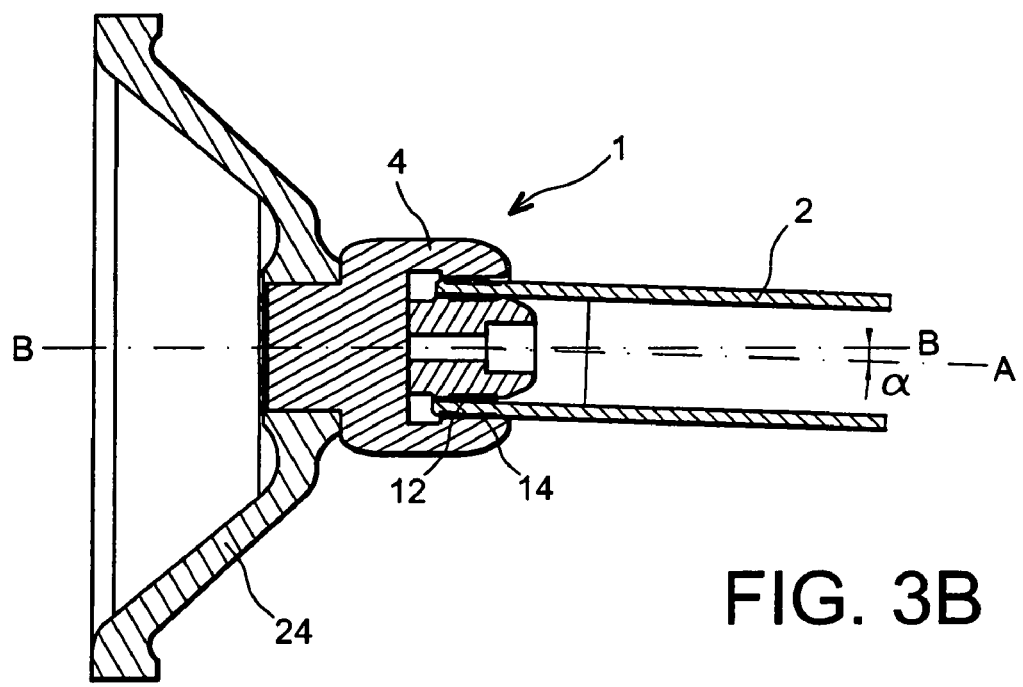

Above all, by means of the block of the invention, it is also possible, as shown in FIG. 3, to incline the first portion 2 relative to the second portion 4, at an angle α, while the contact block 1 is associated, via a support 24 in this example, to high-voltage or medium-voltage switchgear. Advantageously, the allowed angle a varies in the range 1° to 7°, e.g. 4°, and the various dimensions d1, D1, d2, D2, L are chosen for this purpose; the inclination can be effected in all directions about the axis BB. This possibility of accommodating tilt makes it possible to assemble and to disassemble the connection block more easily, and at a lower cost: in most cases it is no longer necessary to have releasable couplings between the pieces of equipment, such couplings generally being constituted by telescopic ferrules and by separable bars.

By having two contacts 12, 14, it is possible to reduce the overall size of the contact block 1 while maintaining high current-passing performance and a possibility of accommodating tilt for assembly and disassembly purposes.

For example, the above embodiment (with D1=97 mm) makes it possible to obtain a high-performance electrical connection for a permanent current higher than 4000 A and for a short-circuit current of 63 kA in 3 seconds, and to do so compactly, and with a possibility of accommodating tilt. More generally, a permanent current in the range 2000 A to 6300 A can be conveyed by a bar 2 of mass up to about 200 kg secured to two stationary elements 4, preferably identical in nature, and each supporting up to about 100 kg; each contact block can withstand a short-circuit current in the range 31.5 kA to 63 kA in 3 s, whilst remaining compact.

In order to improve the mechanical support function of the first portion 2 by the second portion 4, in particular when the spring-forming elements are annular spring-forming elements 12, 14, and above all a lamella band 16, it is possible to insert reinforcements or supports 26 at one of the spring-forming elements of a pair. A reinforcement 26 is shown in FIG. 2B; it makes it possible, if necessary, to support the bar 2 and it avoids metal-on-metal friction between the bar 2 and the recess 6, or between the bar 2 and the central insert 10. The supports 26 can be used in particular for a bar 2 of high mass (some bars can, de facto, be of length at least equal to 10 m or 12 m). A support 26 is thus inserted in the groove 22, by means of the presence of a base portion 28 of length and of height that are adapted to match the shape of the groove 22, i.e., de facto, similar to the strip 18 of the strip of blades 16. However, in place of the blades there is a thicker body portion 30 which makes it possible to incline a blade 20 positioned adjacently. By way of indication, for the above strip, the base portion 28 is of width 30 mm for a height less than 1.5 mm, and the body 30 of width 1=26 mm has a maximum height h of about 3.5 mm.

The shape of the support 26 is designed as a function of the spring-forming element. When the spring-forming elements are constituted by the above-mentioned blades 20, a shape as shown, comprising a rectangular portion of height 13 mm by a width 1=26 mm and whose wall is recessed in the form of a circle portion has proved to offer high performance. The reinforcements can be made of a plastics material, e.g. a polyamide such as PA6; it is desirable for the uninterrupted portion to be larger than a rectangle of 6 mm×26 mm.

Preferably, a plurality of reinforcements 26, e.g. three reinforcements, distributed around the circumference, are used. They thus make it possible to support the mass of conductive bars 2 that are long without preventing the function of accommodating tilt.

The invention claimed is:

1. An electrical connection device comprising:
a first high and/or medium voltage electrical contact block comprising a contact, the contact comprising a recess, the recess being cylindrical and having a cylindrical wall about a first longitudinal axis;
a second high and/or medium voltage electrical contact block comprising a contact, the contact of the second block comprising a cylindrical recess, the second block movable relative to the first block;
a tubular bar having a second longitudinal axis and first and second ends, the first end insertable into the recess of the contact of the first block and the second end insertable into the recess of the contact of the second block;
a first insert that projects into the cylindrical recess of the first block and a second insert that projects into the cylindrical recess of the second block, wherein the wall of each recess and each insert defines an annular space, and wherein the tubular bar is insertable into the annular space; and
at least one pair of conductive spring-forming elements in the first block and at least one pair of conductive spring-forming elements in the second block, wherein one of each of the pair of conductive spring-forming elements is between the insert and the tubular bar, and wherein the other of each of the pair of conductive spring-forming elements is between the tubular bar and the cylindrical wall of the recess,
wherein an inclination of an angle a is possible between the first longitudinal axis and the second longitudinal axis,
wherein the tubular bar remains in electrical contact with the contact of the first and second block during the inclination by the at least one pair of conductive spring-forming elements when the electrical connection device is being assembled and disassembled,
wherein the spring-forming elements are annular, and further comprising at least three mechanical connection supports distributed around the circumference of the cylindrical recess.

2. An electrical connection device comprising two high and/or medium voltage electrical contact blocks according to claim 1, wherein the outside and inside dimensions of the tubular bar being such that clearance exists between the tubular bar and the contact and clearance exists between the tubular bar and the insert, each of the at least one pair of spring-forming elements guaranteeing contact between the tubular bar and the contact at each of said clearances.

3. An electrical connection device comprising two high and/or medium voltage electrical contact blocks according to claim 2, wherein the at least one pair of spring-forming elements are located in the clearances between the contact and the tubular bar in the same plane that is radial relative to one of the first and second axes.

4. An electrical connection device comprising two high and/or medium voltage electrical contact blocks according to claim 3, wherein the two spring-forming elements of each pair are secured to the tubular bar, and are located on either side, in the same plane that is radial to the first axis.

5. An electrical connection device comprising two high and/or medium voltage electrical contact blocks according to claim 3 wherein the two spring-forming elements of each pair are secured to the contact, are located in the same plane that is radial to the second axis, and face each other on the inside wall of the recess and on the outside of the insert.

6. An electrical connection device comprising two high and/or medium voltage electrical contact blocks according to claim 3, having a plurality of pairs of spring-forming elements distributed about the second axis in the same plane that is radial to the second axis.

7. An electrical connection device comprising two high and/or medium voltage electrical contact blocks according to claim 1, wherein the angle of inclination is between 1 degree and 7 degrees.

8. An electrical connection device comprising two high and/or medium voltage electrical contact blocks according to claim 7, wherein the angle of inclination is 4 degrees.

9. An electrical connection device comprising two high and/or medium voltage electrical contact blocks according to claim 1, wherein at least one spring-forming element is a lamella band.

10. An electrical connection device comprising two high and/or medium voltage electrical contact blocks according to claim 1, wherein at least one spring-forming element is an annular spring having inclined turns.

11. An electrical connection device comprising two high and/or medium voltage electrical contact blocks according to claim 1, wherein the at least three mechanical connection supports are made of polyamide.

12. An electrical connection device comprising two high and/or medium voltage electrical contact blocks according to claim 1, wherein the contacts are adapted for a permanent current between 2000 amps and 6300 amps.

13. An electrical connection device comprising two high and/or medium voltage electrical contact blocks according to claim 1, wherein the contacts are adapted for a short circuit between 31.5 kiloamps and 63 kioamps for at least three seconds.

14. An electrical connection device comprising:
a first high and/or medium voltage electrical contact block comprising a contact, the contact comprising a recess, the recess being cylindrical and having a cylindrical wall about a first longitudinal axis;
a second high and/or medium voltage electrical contact block comprising a contact, the contact of the second block comprising a cylindrical recess, the second block movable relative to the first block;
a tubular bar having a second longitudinal axis and first and second ends, the first end insertable into the recess of the contact of the first block and the second end insertable into the recess of the contact of the second block;
a first insert that projects into the cylindrical recess of the first block and a second insert that projects into the cylindrical recess of the second block, wherein the wall of each recess and each insert defines an annular space, and wherein the tubular bar is insertable into the annular space; and
at least one pair of conductive spring-forming elements in the first block and at least one pair of conductive spring-forming elements in the second block, wherein one of each of the pair of conductive spring-forming elements is between the insert and the tubular bar, and wherein the other of each of the pair of conductive spring-forming elements is between the tubular bar and the cylindrical wall of the recess,
wherein an inclination of an angle a is possible between the first longitudinal axis and the second longitudinal axis,
wherein the tubular bar remains in electrical contact with the contact of the first and second block during the inclination by the at least one pair of conductive spring-forming elements when the electrical connection device is being assembled and disassembled,
wherein the spring-forming elements are annular, and
further comprising at least one mechanical connection support, wherein the at least one mechanical connection support is made of polyamide.

15. An electrical connection device comprising two high and/or medium voltage electrical contact blocks according to claim 14, wherein the outside and inside dimensions of the tubular bar being such that clearance exists between the tubular bar and the contact and clearance exists between the tubular bar and the insert, each of the at least one pair of spring-forming elements guaranteeing contact between the tubular bar and the contact at each of said clearances.

16. An electrical connection device comprising two high and/or medium voltage electrical contact blocks according to claim 15, wherein the at least one pair of spring-forming elements are located in the clearances between the contact and the tubular bar in the same plane that is radial relative to one of the first and second axes.

17. An electrical connection device comprising two high and/or medium voltage electrical contact blocks according to claim 16, wherein the two spring-forming elements of each pair are secured to the tubular bar, and are located on either side, in the same plane that is radial to the first axis.

18. An electrical connection device comprising two high and/or medium voltage electrical contact blocks according to claim 16 wherein the two spring-forming elements of each pair are secured to the contact, are located in the same plane that is radial to the second axis, and face each other on the inside wall of the recess and on the outside of the insert.

19. An electrical connection device comprising two high and/or medium voltage electrical contact blocks according to claim 16, having a plurality of pairs of spring-forming elements distributed about the second axis in the same plane that is radial to the second axis.

20. An electrical connection device comprising two high and/or medium voltage electrical contact blocks according to claim 14, wherein the angle of inclination is between 1 degree and 7 degrees.

21. An electrical connection device comprising two high and/or medium voltage electrical contact blocks according to claim 14, wherein at least one spring-forming element is a lamella band.

22. An electrical connection device comprising two high and/or medium voltage electrical contact blocks according to claim 14, wherein at least one spring-forming element is an annular spring having inclined turns.

23. An electrical connection device comprising two high and/or medium voltage electrical contact blocks according to claim 14, further comprising three mechanical connection supports distributed around the circumference of the cylindrical recess.

24. An electrical connection device comprising two high and/or medium voltage electrical contact blocks according to claim 14, wherein the angle of inclination is 4 degrees.

25. An electrical connection device comprising two high and/or medium voltage electrical contact blocks according to claim 14, wherein the contacts are adapted for a permanent current between 2000 amps and 6300 amps.

26. An electrical connection device comprising two high and/or medium voltage electrical contact blocks according to claim 14, wherein the contacts are adapted for a short circuit between 31.5 kiloamps and 63 kioamps for at least three seconds.

* * * * *